(12) United States Patent
Ruelas

(10) Patent No.: US 9,928,368 B2
(45) Date of Patent: *Mar. 27, 2018

(54) CONFIGURING CONFIGURATION SETTINGS USING A USER CONTEXT

(71) Applicant: International Business Machines Corporation, Armonk, NY (US)

(72) Inventor: Gabriel A. Ruelas, Jalisco (MX)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/283,860

(22) Filed: Oct. 3, 2016

(65) Prior Publication Data

US 2017/0032127 A1 Feb. 2, 2017

Related U.S. Application Data

(63) Continuation of application No. 14/033,600, filed on Sep. 23, 2013, now Pat. No. 9,501,648, which is a (Continued)

(30) Foreign Application Priority Data

Nov. 1, 2012 (CA) ..................... 2794132

(51) Int. Cl.
*G06F 15/177* (2006.01)
*G06F 21/57* (2013.01)
(Continued)

(52) U.S. Cl.
CPC .......... *G06F 21/572* (2013.01); *G06F 9/4411* (2013.01); *H04L 63/0861* (2013.01); *H04L 63/123* (2013.01)

(58) Field of Classification Search
None
See application file for complete search history.

(56) References Cited

U.S. PATENT DOCUMENTS 6,353,885 B1   3/2002 Herzi et al.
6,658,562 B1   12/2003 Bonomo et al.
(Continued)

FOREIGN PATENT DOCUMENTS

WO   2011071493 A1   6/2011

OTHER PUBLICATIONS

Hewlett-Packard Development Company, "HP Business Desktop BIOS", May 2004, 21 pages.
(Continued)

*Primary Examiner* — Brian Whipple
*Assistant Examiner* — Gregory P. Tolchinsky
(74) *Attorney, Agent, or Firm* — Daniel Simek; Hoffman Warnick LLC

(57) ABSTRACT

An illustrative embodiment of a computer-implemented process for configuring configuration settings authenticates a user of a predetermined system to form an authenticated user and obtains configurable configuration settings associated with the authenticated user for the predetermined system to form obtained settings. The obtained settings are used in a further portion of a power-on process to configure the predetermined system, whereby configuring the predetermined system alters available resources and associated resource consumption of the predetermined system subject to the obtained settings.

14 Claims, 6 Drawing Sheets

Related U.S. Application Data continuation of application No. 13/950,543, filed on Jul. 25, 2013.

(51) Int. Cl.
*G06F 9/44* (2018.01)
*H04L 29/06* (2006.01)

(56) References Cited

U.S. PATENT DOCUMENTS

| | | |
|---|---|---|
| 6,792,618 B1 * | 9/2004 | Bendinelli ......... H04N 7/17318 348/E7.071 |
| 7,200,526 B1 * | 4/2007 | Davidov ............. G06F 11/3428 702/186 |
| 7,447,895 B2 | 11/2008 | Chiu et al. |
| 7,784,098 B1 * | 8/2010 | Fan ..................... G06F 11/1471 726/24 |
| 7,856,562 B2 | 12/2010 | Branover et al. |
| 8,352,717 B2 * | 1/2013 | Campbell ........... G06F 11/1417 713/2 |
| 2002/0099934 A1 | 7/2002 | Cromer et al. |
| 2004/0075680 A1 * | 4/2004 | Grace ..................... H04L 41/22 715/734 |
| 2005/0091522 A1 * | 4/2005 | Hearn ................... G06F 21/575 726/26 |
| 2006/0123240 A1 * | 6/2006 | Chaiken ................. G06F 21/32 713/186 |
| 2008/0022367 A1 | 1/2008 | Dailey et al. |
| 2008/0104348 A1 * | 5/2008 | Kabzinski .............. G06F 21/78 711/164 |
| 2010/0058010 A1 * | 3/2010 | Augenstein ......... G06F 11/1451 711/162 |
| 2010/0306773 A1 * | 12/2010 | Lee ....................... G06F 9/5077 718/1 |
| 2012/0123999 A1 * | 5/2012 | Ashutosh ............ G06F 11/1453 707/618 |

OTHER PUBLICATIONS

Office Action for U.S. Appl. No. 13/950,543, dated Jun. 4, 2015, 33 pages.
Office Action for U.S. Appl. No. 13/950,543, dated Jul. 6, 2015, 29 pages.
Office Action for U.S. Appl. No. 13/950,543, dated Jan. 12, 2016, 34 pages.
Office Action for U.S. Appl. No. 13/950,543, dated Jul. 19, 2016, 37 pages.
Notice of Allowance and Fee(s) Due for U.S. Appl. No. 14/033,600, dated Jul. 28, 2016, 22 pages.
Office Action for U.S. Appl. No. 14/033,600, dated Jun. 2, 2015, 32 pages.
Final Office Action for U.S. Appl. No. 14/033,600, dated Jul. 6, 2015, 29 pages.
Office Action for U.S. Appl. No. 14/033,600, dated Jan. 11, 2016, 31 pages.
Office Action for U.S. Appl. No. 14/033,600, dated Mar. 10, 2016, 34 pages.
Notice of Allowance and Fee(s) Due for U.S. Appl. No. 13/950,543, dated Apr. 28, 2017, 41 pages.

* cited by examiner

Configuration system 300

CONFIGURING CONFIGURATION SETTINGS USING A USER CONTEXT

REFERENCE TO PRIOR APPLICATIONS

The current application is a continuation application of U.S. Utility application Ser. No. 13/950,543, which was filed on 25 Jul. 2013, and U.S. Utility application Ser. No. 14/033,600, which was filed on 23 Sep. 2013, which are both hereby incorporated by reference, and which both claimed the benefit of Canadian Patent Application No. CA2794132, which was filed on 1 Nov. 2012.

TECHNICAL FIELD

This disclosure relates generally to configuring a basic input output system (BIOS) in a data processing system and more specifically to managing a configuration for BIOS by usage context associated with a user in the data processing system.

RELATED ART

In many personal computers, a firmware interface referred to as a basic input/output system is provided and is the first code run by the computer when power is applied. On start up, the first code typically performs a form of power-on self-test, to initialize and identify system devices including typical components of processor, memory, video subsystem, input devices such as a keyboard and pointing device as well as storage devices and network connections and other hardware. The instructions comprising the BIOS locate boot loader software typically on a storage device of some form (may be a network device) and load the boot loader. The boot loader is executed to enable control to pass to the operating system of the computer.

BIOS software is typically stored on a non-volatile memory chip on a motherboard of the computer designated to use the BIOS. BIOS was designed to work with a particular model of computer, and interface with devices comprising the system. The contents of the BIOS however can be modified or completely replaced without removing physical memory containing the BIOS from the circuit of the computer, enabling the software comprising instructions for the BIOS to be changed in place.

A user interface (UI) is typically provided as a menu accessible to a user by pressing a predetermined combination of keys on the keyboard to interrupt the usual process of loading the BIOS when the computer starts. Using a user interface enables a user to alter or configure hardware support, set a system clock, enable or disable system components including memory and devices, select devices eligible for use a potential boot device (and an predetermined order of usage), and to establish some level of system security by setting or activating specified passwords for securing access to the BIOS user interface functions, and access to devices. Current computers may also refer to the BIOS as a form of firmware. Firmware may be more representative of the span of support provided by the newer instructions associated with control and support of complex devices.

With an increasing number of people having access to personal computers and an associated higher demand to have computers turned on for lengthy periods of time or continuous operation, energy consumption associated with the computers increases daily. More intelligent methods to properly manage the energy consumption associated with the computers are required to avoid wasting energy and accordingly enable computer usage environment friendly. For example, a family has purchased a very powerful computer typically use minimal capability most of the time by children although all capabilities are active and powered.

SUMMARY

According to an embodiment, a computer-implemented process for configuring configuration settings authenticates a user of a predetermined system to form an authenticated user and obtains configurable configuration settings associated with the authenticated user for the predetermined system to form obtained settings. The obtained settings are used in a further portion of a power-on process to configure the predetermined system, whereby configuring the predetermined system alters available resources and associated resource consumption of the predetermined system subject to the obtained settings.

According to another embodiment, a computer program product for configuring configuration settings comprises a computer recordable-type media containing computer executable program code stored thereon. The computer executable program code comprises computer executable program code for authenticating a user of a predetermined system to form an authenticated user; computer executable program code for obtaining configurable configuration settings associated with the authenticated user for the predetermined system to form obtained settings; and computer executable program code for using the obtained settings in a further portion of a power-on process to configure the predetermined system, whereby configuring the predetermined system alters available resources and associated resource consumption of the predetermined system subject to the obtained settings.

According to another embodiment, an apparatus for configuring configuration settings comprises a communications fabric; a memory connected to the communications fabric, wherein the memory contains computer executable program code; a communications unit connected to the communications fabric; an input/output unit connected to the communications fabric; a display connected to the communications fabric and a processor unit connected to the communications fabric. The processor unit executes the computer executable program code to direct the apparatus to authenticate a user of a predetermined system to form an authenticated user; obtain configurable configuration settings associated with the authenticated user for the predetermined system to form obtained settings; and use the obtained settings in a further portion of a power-on process to configure the predetermined system, whereby configuring the predetermined system alters available resources and associated resource consumption of the predetermined system subject to the obtained settings.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
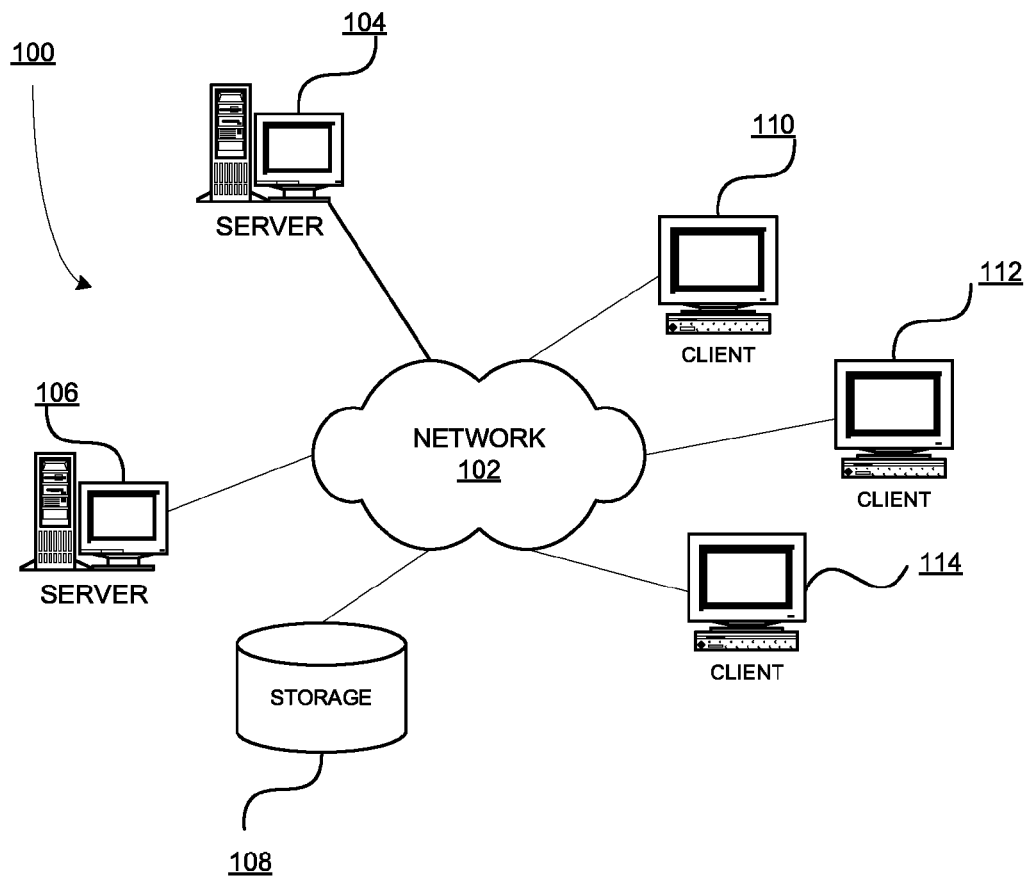
FIG. 1 is a block diagram of an exemplary network data processing system operable for various embodiments of a configuration system of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage medium(s) may be utilized. A computer-readable data storage medium may be, for example, but not limited to, an electronic, magnetic, optical, or semiconductor system, apparatus, or device, or any suitable combination of the foregoing. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing. In the context of this document, a computer-readable data storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
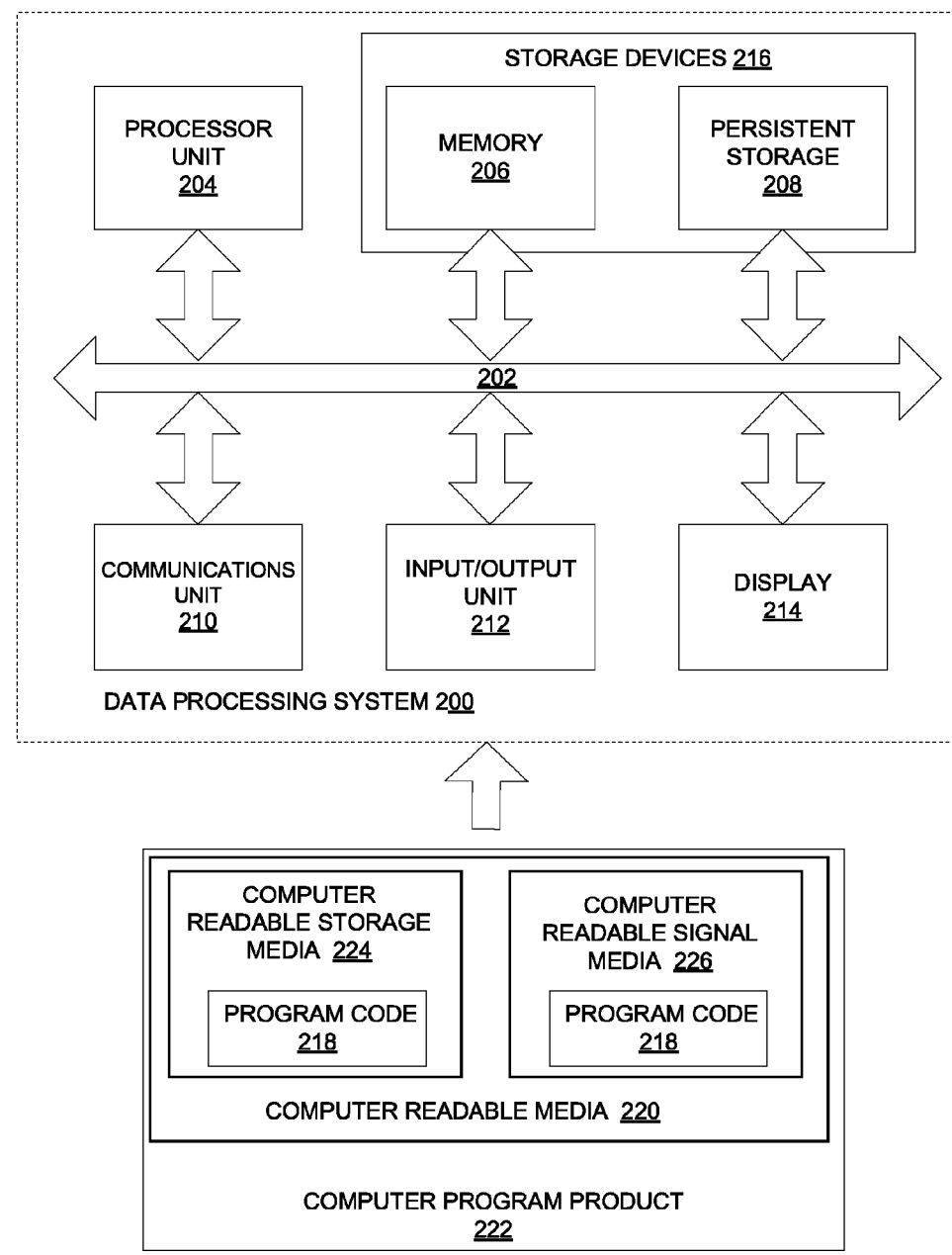
FIG. 2 is a block diagram of an exemplary data processing system operable for various embodiments of a configuration system of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments of managing a configuration for BIOS by usage context may be implemented. Network data processing system 100 may include a network of computers in which the illustrative embodiments of managing a configuration for BIOS in accordance with a usage context may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers on which managing a configuration for BIOS by user context is performed. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

For example an embodiment of the disclosed process for configuring configuration settings authenticates a user of a predetermined system to form an authenticated user and obtains configurable configuration settings associated with the authenticated user for the predetermined system to form obtained settings. The obtained settings are used in a further portion of a power-on process to configure the predetermined system. The configuring of the predetermined system thus alters available resources and associated resource consumption of the predetermined system subject to the obtained settings.

With reference to FIG. 2 a block diagram of an exemplary data processing system operable for various embodiments of the disclosure is presented. In this illustrative example of managing a configuration for BIOS by usage context, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206 for managing a configuration for BIOS by usage context. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for configuring configuration settings is presented. Processor unit 204 authenticates a user of a predetermined system to form an authenticated user. Processor unit 204 further obtains configurable configuration settings, from storage devices 216, associated with the authenticated user for the predetermined system to form obtained settings. The obtained settings are used by processor unit 204 in a further portion of a power-on process to configure the predetermined system, whereby configuring the predetermined system, such as data processing 200, alters available resources and associated resource consumption of the predetermined system subject to the obtained settings.

Figure 3:
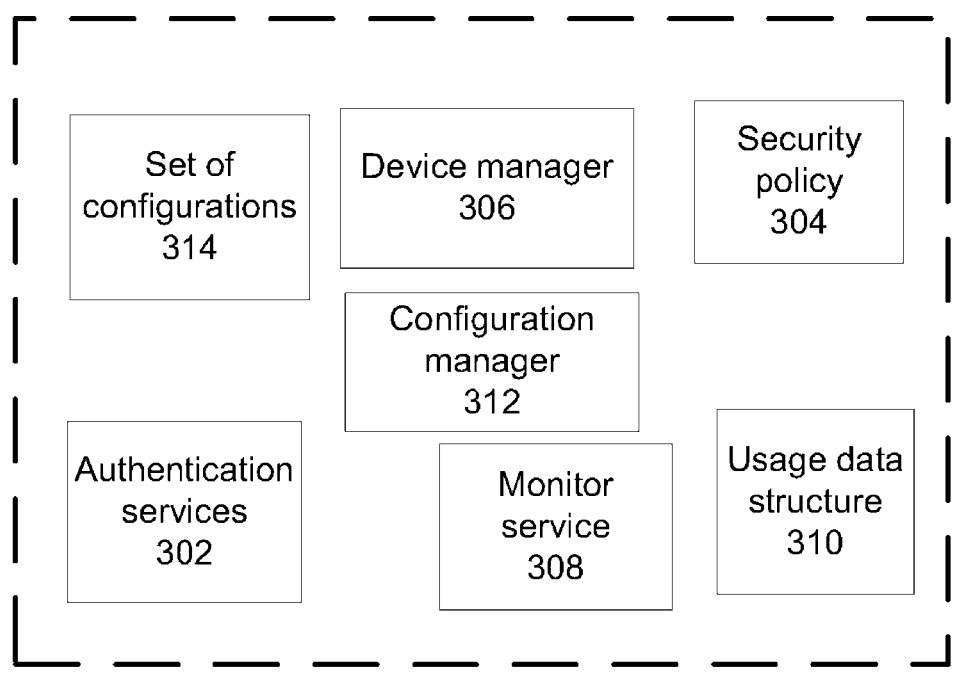
FIG. 3 is a block diagram of a configuration system operable for various embodiments of the disclosure.

With reference to FIG. 3 a block diagram of a configuration system operable for various embodiments of the disclosure is presented. Configuration system 300 is an example of a configuration system for managing a configuration for a basic input/output system (also referred to more generally as firmware) by a usage context associated with a user.

An embodiment of the disclosure enables user authentication of a user at power-on time of a computer and uses that information to configure the BIOS settings (user based BIOS configuration). Using the embodiment of the disclosure, the BIOS automatically enables/disables certain computer features or modules to enable consumption of energy in accordance with user needs or usage.

Configuration system 300 comprises a number of components, which leverage support of an underlying data processing system such as network data processing system 100 of FIG. 1 and data processing system 200 of FIG. 2. Components of configuration system 300 include a number of management services and resources including authentication services 302, security policy 304, device manager 306, monitor service 308, usage data structure 310, configuration manager 312, and set of configurations 314. Components of configuration system 300 may be implemented as a set of associated interdependent discrete components or as a set of some combination of associated interdependent discrete components or a monolithic structure without limitation of delivering the disclosed function of the described components.

Authentication services 302 provide a capability to identify a user and determine whether the user is permitted to perform one or more actions using one or more resources of the system for which a request has been made. Authentication services 302 uses information maintained in a data structure of security policy 304. Security policy 304 maintains policies describing usage criteria for a set of resources associated with a specified system. For example, a policy identifies users of group A as enabled to use a particular disk drive attached to the computer. In another example, matching a biometric pattern saved in security policy 304 may be required to gain access to the computer or a specified device.

Device manager 306 provides a capability to control the devices comprising the computer system. Device manager 306 has the operational capability to enable or disable features and functions of devices having a management capability or instructing another component to perform the setting of an operating state of a device. For example, where a device does not provide internal support for receiving and responding to instructions from device manager 306 and operating system component may take the device online or offline as needed.

Monitor service 308 provides a capability of being aware of component utilization. Utilization includes the usage of a particular device or component including processor, memory, and devices by a user or group of users at a point in time as well as over a predetermined period of time. Usage information can be captured by monitor service 308 and saved for further processing using usage data structure 310. Usage data structure 310 stores previous information representative of the usage of a particular device or component. Monitor service 308 performs a snapshot of predetermined devices and components in accordance with a predetermined schedule such as that which may be used in sampling or responsive to an event including a time of day or utilization value being reached.

Configuration manager 312 provides a capability to create, maintain and modify set of configurations 314. Set of configurations 314 comprises one or more selectable device configuration files applicable to the computer having associated with a basic input/output system. The configuration files may also refer to changes in the BIOS interchangeably as a firmware update. Selectively applying a specific BIOS or firmware configuration to the computer alters the characteristics of the computer to conform to the settings of the applied configuration.

A configuration in the set of configurations is typically in a human readable form. Specification of the configuration provides one or more values for a respective parameter of an associated device. For example, when a memory device supports a choice in a range of memory values between 1 gigabyte and 8 gigabytes a particular configuration file specifies a setting of the memory value to 6 gigabytes indicating the 6 gigabytes should be enabled for use by the computer. In another example, 3 hard disks are available for use, but the selected configuration file only specifies hard disk 1 and hard disk 3 are enabled for use. Using the examples just described alters the hardware available for use and therefore the characteristics of the associated computer.

Figure 4:
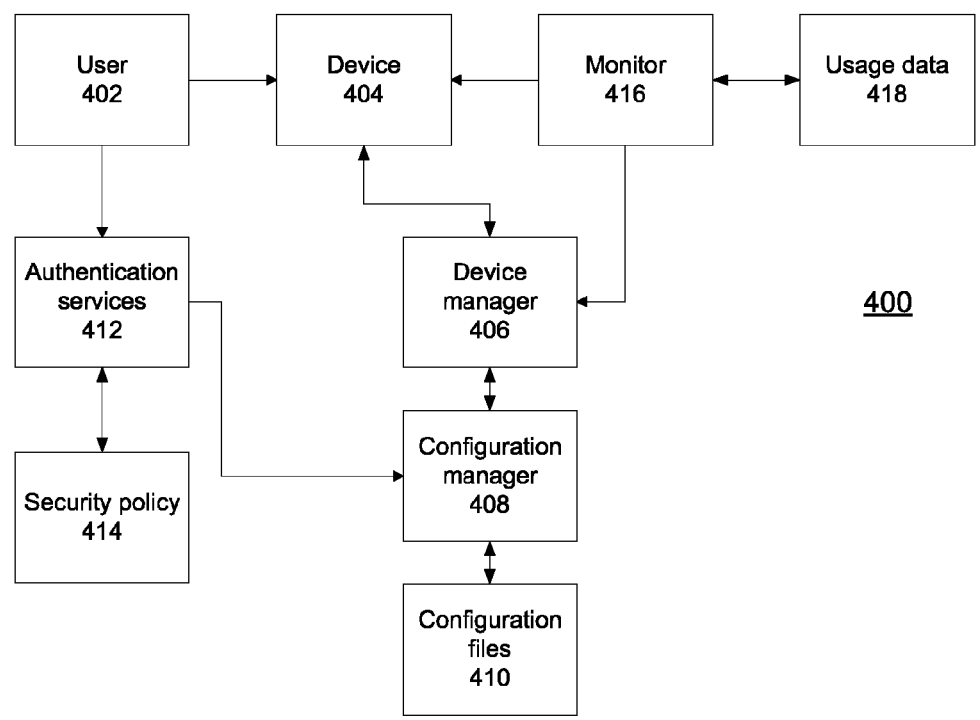
FIG. 4 is a block diagram of using the configuration system of FIG. 3 operable for various embodiments of the disclosure.

With reference to FIG. 4 a block diagram of using a configuration system operable for various embodiments of the disclosure is presented. Configuration system 400 is an example of component relationships in a configuration system for managing a configuration for a basic input/output system by usage context such as that described in configuration system 300 of FIG. 3.

Configuration system 400 enables user 402 to be authenticated using authentication services 412. Authentication services 412 uses one or more policies of security policy 414 in combination with biometrics to ascertain the identity of a user requesting access to (use of) a particular computer. Authentication may be performed on or by the same computer requested for use or may be performed through another computer via a network. For example using client 110 a user may be authenticated using a combination of biometric services on client 110 through network 102 to server 106 (all of FIG. 1) containing authentication services 412.

Responsive to a successful authentication process a user 402 is permitted to use an identified computer in a predetermined configuration. Selection of the predetermined configuration is performed when authentication services 412 notifies configuration manager 408 of the successful authentication for the user 402. Configuration manager 408 selects either a specific configuration associated with the identified user 402 or a default configuration when no specific configuration is associated with the identified user 402 from among a set of previously defined configurations in configuration files 410.

The selected configuration information is passed to device manager 406 which implements appropriate device settings for device 404. Appropriate device settings include enabling or disabling some or all features associated with a respective device. Using various settings a device is accordingly made available for use in some capacity as a portion of the computing complex of the computer or not at all.

In the current example of configuration system 400, device 404 has been enabled for use in the specified configuration. Monitor 416 periodically takes a snapshot of the utilization of the devices in the current configuration associated with the computer. The snapshot process captures utilization information representative of usage of devices defined in the current configuration applied to the computer and stores the information in usage data 418.

Monitor 418 also periodically compares a current snapshot with a previous snapshot information saved in usage data 418 or with a predetermined threshold based on previous device usage (e.g., a user may have used/required more or less device resources during one or more previous sessions on the device). Responsive to a predefined variance between the current snapshot and the previous snapshot information, the predetermined threshold action can be taken to adjust the current configuration. Adjusting of the configuration typically results in application of a replacement configuration from among the set of configurations defined in configuration files 410 using configuration manager 408. Monitor 418 is also capable of determining a timer interval and requesting a change be initiated to the current configuration.

For example, monitor 418 takes a snap shot of utilization of devices in the current configuration and compares the snapshot with a previous snapshot for the same configuration. A determination is made that utilization exceeds a predefined variance for a storage device and requests configuration manager 408 to add a storage device using an adjusted configuration. In another example, monitor 418 determines a predefined calendar event occurs and in response instructs configuration manager 408 to enable network access using a network adapter device as in device 404.

Figure 5:
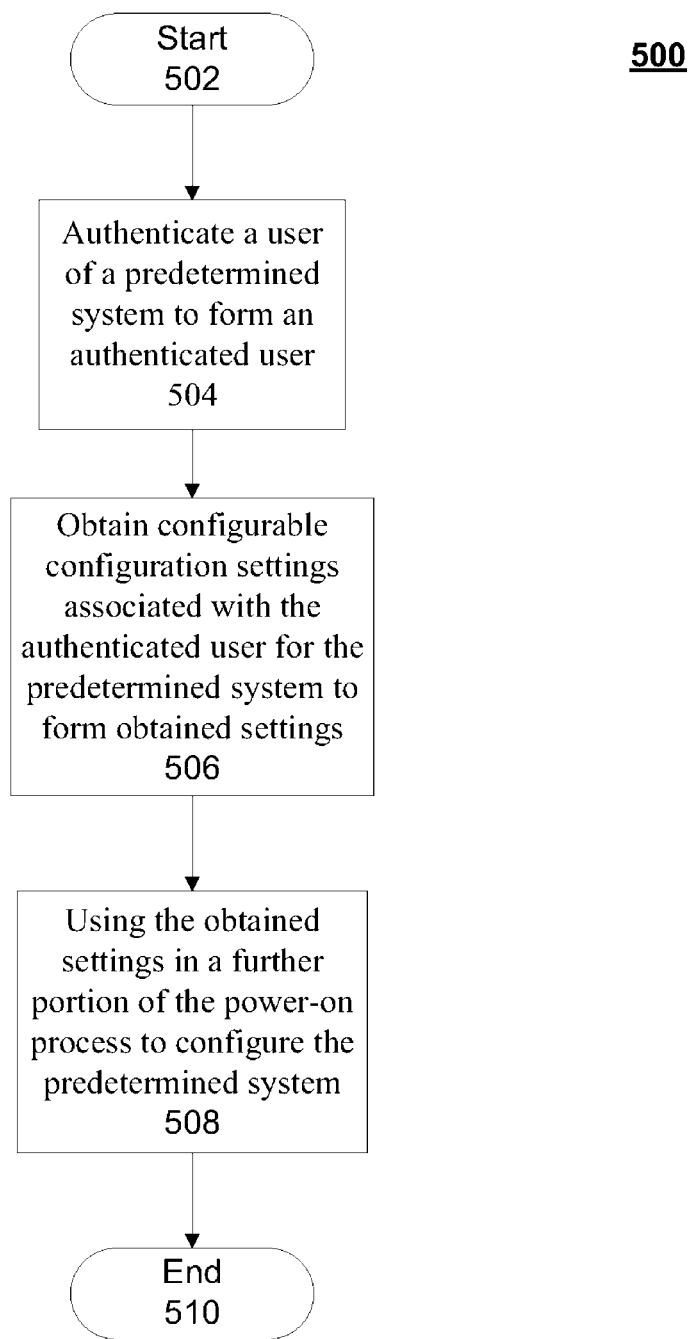
FIG. 5 is a flow chart of a process using the configuration system of FIG. 3 operable for various embodiments of the disclosure.

With reference to FIG. 5 a flow chart of a process using a configuration system operable for various embodiments of the disclosure is presented. Process 500 is an example of an embodiment using a configuration system for managing a configuration for a basic input/output system or firmware by usage context such as that described in configuration system 300 of FIG. 3. The terms basic input/output system and firmware apply equally well to the configuration information and may be used interchangeably throughout the following example.

Process 500 begins (502) and authenticates a user of a predetermined system to form an authenticated user (504). The user requests to access and use the predetermined system, however the system performing the authentication need not be the system requested by the user.

Process 500 obtains configurable configuration settings associated with the authenticated user for the predetermined system to form obtained settings (506). The configurable configuration settings may be obtained from a configuration manager using a set of predefined configuration files associated with one or more users and for one or more systems and devices. In an alternate embodiment process 500 obtains configurable configuration settings associated with the authenticated user for the predetermined system from a storage location. For example, the storage locations include local storage locations and remote locations comprising a remote site, also referred to as a cloud or cloud service and a portable storage device such as a flash memory device.

Process 500 uses the obtained settings in a further portion of the power-on process to configure the predetermined system (508) and terminates thereafter (510). Using configuration setting specific to a user enables a same system to be configured differently in accordance with a respective user during a power on sequence of operations. Further adjustment may also be made in selective application of a configuration for a user based on usage and calendar event occurrence.

Figure 6:
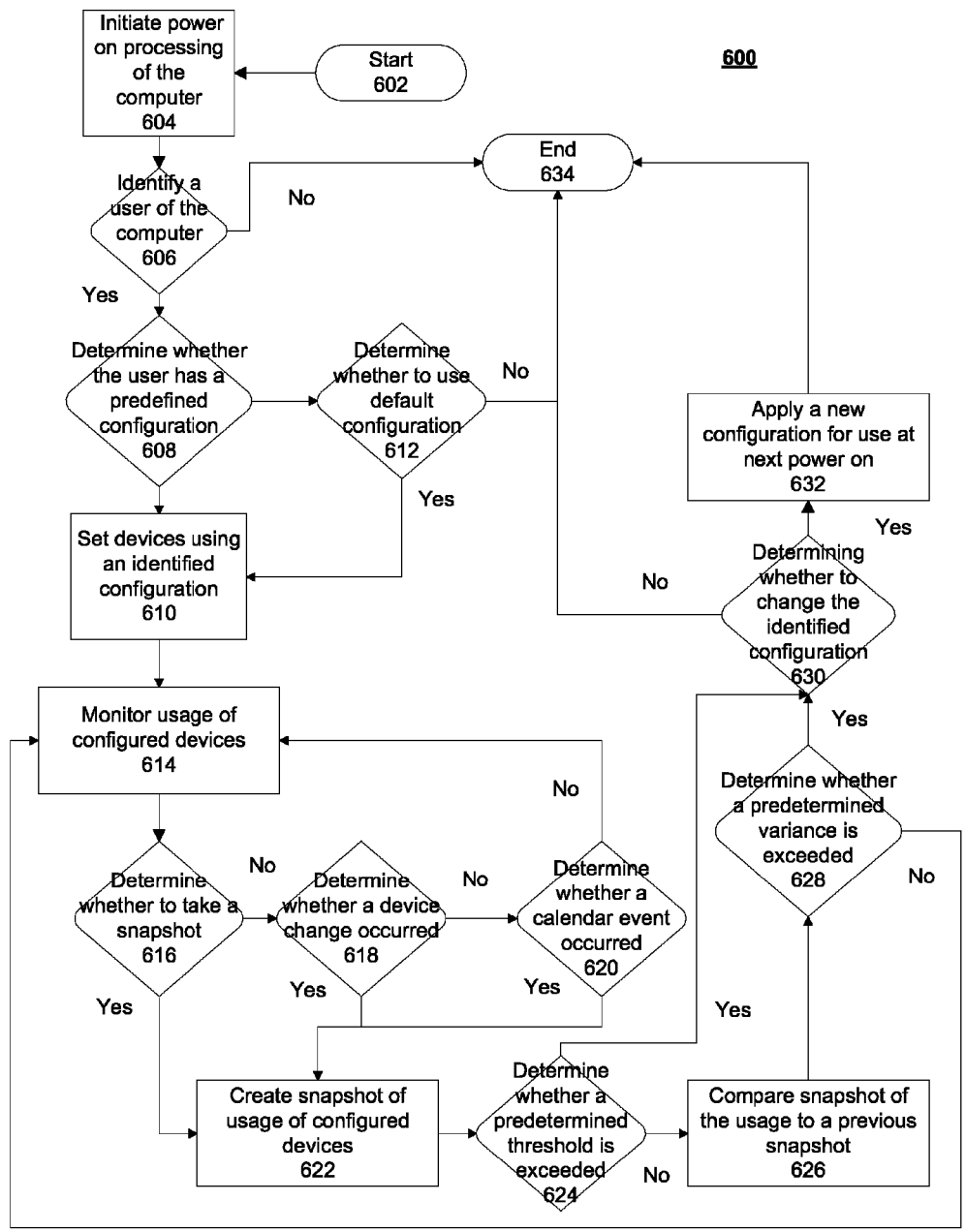
FIG. 6 is a flow chart of a process using the configuration system of FIG. 3 operable for various embodiments of the disclosure.

With reference to FIG. 6 a flow chart of a process using a configuration system operable for various embodiments of the disclosure is presented. Process 600 is an example of an embodiment using a configuration system for managing a configuration for a basic input/output system or firmware by usage context such as that described in configuration system 300 of FIG. 3. The terms basic input/output system and firmware apply equally well to the configuration information and may be used interchangeably throughout the following example.

Process 600 begins (602) with initiation of power processing of a computer (604). A user typically initiates the power on sequence to ready a computer for use. During the power on sequence of processing process 600 identifies a user of the computer (606). Responsive to a determination the user cannot be identified, process 600 terminates (634). Responsive to a determination the user is identified, process 600 determines whether the identified user has a predefined configuration (608).

Responsive to a determination the identified user does not have a predefined configuration, process 600 determines whether to use a default configuration (612). Responsive to a determination the identified user does not have a default configuration, process 600 terminates as before (634). Responsive to a determination the identified user has a predefined configuration, process 600 sets devices using the predefined configuration (610). The selected predefined configuration is also referred to as an identified configuration. In an alternate embodiment process 600 obtains configurable configuration settings associated with the authenticated user for the predetermined system from a storage location. For example, the storage locations include local storage locations and remote locations comprising a remote site, also referred to as a cloud or cloud service and a portable storage device such as a flash memory device. The obtained configuration is then loaded and executed on the computer.

Process 600 monitors usage of configured devices (614). During the monitoring sub-process process 600 determines whether to take a snapshot (616). Responsive to a determination to not take a snapshot, process 600 determines whether a device change has occurred (618). Responsive to a determination a device change has not occurred process 600 determines whether a calendar event has occurred (620). Responsive to a determination a calendar event has not occurred, process 600 loops back to perform process 614 as before.

Responsive to a determination to one of take a snapshot, a device change has occurred or a calendar event has occurred, process 600 creates a snapshot of usage of configured devices (622). Using the information in the snapshot process 600 determines whether a predetermined threshold is exceeded (624). Responsive to a determination the predetermined threshold is exceeded, process 600 skips ahead to perform process 630.

Responsive to a determination the predetermined threshold is not exceeded, process 600 compares the snapshot of usage to a previous snapshot (626). The comparison is performed using a current snapshot and a previous snapshot of a same configuration as maintained in the usage data structure previously described. Process 600 determines whether a predetermined variance is exceeded (628). Responsive to a determination the predetermined variance is not exceeded, process 600 loops back to perform process 614 as before.

Responsive to a determination the predetermined variance is exceeded, process 600 determines whether to change the identified configuration (630). Responsive to a determination to not change the identified configuration, process terminates at 634 as before. The current configuration remains in effect. Responsive to a determination to change the identified configuration, process 600 applies a new configuration available for use at next power on sequence (632) and terminates thereafter (634). The new configuration applied is selected as one of an alternative in a set of configurations or as a replacement and uses information associated with the device causing the threshold or the variance to be exceeded.

For example, a computer is available for use having a maximum configuration of 8 gigabytes of memory, 4 processors and 2 hard drives. A child and an adult will share the computer. When the adult powers on the computer, the power-on process requests the adult user to authenticate, and based on the authentication the computer determines BIOS settings require configuring to enable usage of the computer at full capacity. The computer is accordingly configured to use all available hardware. When the child powers on the computer, the power-on process requests the child to authenticate, and based on the authentication the computer determines BIOS settings require configuring to enable usage of the computer at a predefined minimal capacity. Responsive to a determination that the BIOS settings require configuring to enable usage of the computer at minimal capacity, the computer is initially configured to have only 1 gigabyte of memory, 1 processor and 1 hard drive.

An embodiment of the disclosure can be extended to typically configure additional modules or devices attached to a computer system. Embodiments can be implemented with a combination of software and hardware modules to provide a capability including enabling power-on code to authenticate users, enabling modules to be enabled/disabled based on a BIOS configuration, enabling power-on code to set a BIOS configuration in accordance with the user being authenticated at power-on, enabling a BIOS configuration to be changed in accordance with usage of the user exceeding predetermined threshold or timer value and enabling BIOS to preconfigure BIOS settings to be used by each specific user.

Embodiments of the disclosed process further enable programmatically adjusting BIOS settings based on machine usage patterns by monitoring resource usage and maintaining a file with highest values and the times used at high values. Using the captured monitor information at next boot time the BIOS or device manager or configuration manager (managing enabling/disabling BIOS setting) reads the file and automatically adjusts the setting based on respective values in the file. The user-based configuration can therefore be programmatically adjusted based on usage patterns of the user (and device).

Embodiments of the disclosed process further enable computer features and/or peripherals based on requirements of the user of the computer. The user-based configuration can be initially set manually or use a default configuration. The user-based configuration can be programmatically adjusted based on usage patterns, wherein a predetermined usage time or period (a calendar event) provides a criterion for evaluation of usage over a predetermined interval or at a specified time and/or date. Embodiments of the disclosed process can be implemented at a BIOS level using biometric identification (for example, fingerprint of a user) at boot time or at an operating system level to enable deployment on existing hardware.

Embodiments of the disclosed process may also be implemented in a pre-boot execution environment (PXE is an industry-standard method of booting a computer to a network server), which provides remote management features including initial operating system deployment and configuration. With PXE support, a new computer can be installed into a networked environment without using bootable storage media of the computer because the computer can download an image for installation over the network. In addition, an emergency boot function enables a computer to boot using a network image in event the local operating system or storage device has been compromised.

Thus is presented in an illustrative embodiment a computer-implemented process for configuring configuration settings. The computer-implemented process authenticates a user of a predetermined system to form an authenticated user and obtains configurable configuration settings associated with the authenticated user for the predetermined system to form obtained settings. The computer-implemented process in a further portion of a power-on process to configure the predetermined system uses the obtained settings. Configuring the predetermined system alters available resources and associated resource consumption of the predetermined system subject to the obtained settings.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage medium having computer executable instructions stored thereon in a variety of forms. Examples of computer readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A process for configuring configuration settings, the process implemented by computer executable program code executed by a processor and stored in a memory, the process comprising:
   authenticating a user of a predetermined system during a power-on process to form an authenticated user;
   obtaining, for the authenticated user during the power-on process, configurable configuration settings associated with the authenticated user for the predetermined system to form obtained settings; and
   using the obtained settings in a further portion of the power-on process to configure the predetermined system, the using of the obtained settings including:
     monitoring usage of configured devices of the predetermined system;
     determining whether to take a snapshot;
     responsive to a determination to take a snapshot, creating a snapshot of usage of the configured devices;
     determining whether a predetermined threshold of usage of the configured devices is exceeded;
     responsive to a determination that the usage of the configured devices is below the predetermined threshold of usage, comparing the snapshot of the usage with a previous snapshot;
     determining whether a predetermined variance is exceeded;
     responsive to a determination that the predetermined variance is exceeded, determining whether to change the obtained settings in an identified configuration;
     responsive to a determination to not take the snapshot, determining whether a device change occurred;
     responsive to a determination the device change occurred, creating the snapshot of usage of the configured devices;
     responsive to a determination the device change did not occur, determining whether a calendar event occurred; and
     responsive to a determination the calendar event occurred, creating the snapshot of usage of the configured devices.

2. The process of claim 1, wherein the authenticating the user of the predetermined system to form the authenticated user further comprises:
   performing a biometric confirmation of the user during a portion of the power-on process of the predetermined system.

3. The process of claim 1, wherein the obtaining configurable configuration settings associated with the authenticated user for the predetermined system to form obtained settings further comprises:
   determining whether the user has a predefined configuration;
   responsive to a determination that the user does have a predefined configuration, using the predefined configuration as the obtained settings;
   responsive to a determination that the user does not have a predefined configuration, determining whether the user has a default configuration; and
   responsive to a determination that the user has a default configuration, using the default configuration as the obtained settings.

4. The process of claim 1, wherein the using the obtained settings in the further portion of the power-on process to configure the predetermined system further comprises:
   responsive to a determination to change the obtained settings in an identified configuration, applying a new configuration for use at a next power-on.

5. The process of claim 1, wherein the using the obtained settings in the further portion of the power-on process to configure the predetermined system further comprises:
   responsive to a determination that the predetermined variance is not exceeded, monitoring usage of configured devices.

6. A computer program product stored on a computer readable storage device for performing a method for configuring configuration settings, the computer program product comprising program code that is executed by a processor for:
   authenticating a user of a predetermined system during a power-on process to form an authenticated user;
   obtaining, for the authenticated user during the power-on process, configurable configuration settings associated with the authenticated user for the predetermined system to form obtained settings; and
   using the obtained settings in a further portion of the power-on process to configure the predetermined system, the using of the obtained settings including:
      monitoring usage of configured devices of the predetermined system;
      determining whether to take a snapshot;
      responsive to a determination to take a snapshot, creating a snapshot of usage of the configured devices;
      determining whether a predetermined threshold of usage of the configured devices is exceeded;
      responsive to a determination that the usage of the configured devices is below the predetermined threshold of usage, comparing the snapshot of the usage with a previous snapshot;
      determining whether a predetermined variance is exceeded;
      responsive to a determination that the predetermined variance is exceeded, determining whether to change the obtained settings in an identified configuration;
      responsive to a determination to not take the snapshot, determining whether a device change occurred;
      responsive to a determination the device change occurred, creating the snapshot of usage of the configured devices;
      responsive to a determination the device change did not occur, determining whether a calendar event occurred; and
      responsive to a determination the calendar event occurred, creating the snapshot of usage of the configured devices.

7. The computer program product of claim 6, wherein the authenticating the user of the predetermined system to form the authenticated user further comprises:
   performing a biometric confirmation of the user during a portion of the power-on process of the predetermined system.

8. The computer program product of claim 6, wherein the obtaining configurable configuration settings associated with the authenticated user for the predetermined system to form obtained settings further comprises:
   determining whether the user has a predefined configuration;
   responsive to a determination that the user does have a predefined configuration, using the predefined configuration as the obtained settings;
   responsive to a determination that the user does not have a predefined configuration, determining whether the user has a default configuration; and
   responsive to a determination that the user has a default configuration, using the default configuration as the obtained settings.

9. The computer program product of claim 6, wherein the using the obtained settings in the further portion of the power-on process to configure the predetermined system further comprises:
   responsive to a determination to change the obtained settings in an identified configuration, applying a new configuration for use at a next power-on.

10. The computer program product of claim 6, wherein the using the obtained settings in the further portion of the power-on process to configure the predetermined system further comprises:
    responsive to a determination that the predetermined variance is not exceeded, monitoring usage of configured devices.

11. An apparatus for configuring configuration settings, the apparatus comprising:
    a memory for storing computer executable program code to direct the apparatus; and
    a processor for executing the computer executable program code to direct the apparatus to:
       authenticate a user of a predetermined system during a power-on process to form an authenticated user;
       obtain, for the authenticated user during the power-on process, configurable configuration settings associated with the authenticated user for the predetermined system to form obtained settings; and
       use the obtained settings in a further portion of the power-on process to configure the predetermined system, using of the obtained settings including:
          monitoring usage of configured devices of the predetermined system;
          determining whether to take a snapshot;
          responsive to a determination to take a snapshot, creating a snapshot of usage of the configured devices;
          determining whether a predetermined threshold of usage of the configured devices is exceeded;
          responsive to a determination that the usage of the configured devices is below the predetermined threshold of usage, comparing the snapshot of the usage with a previous snapshot;
          determining whether a predetermined variance is exceeded;
          responsive to a determination that the predetermined variance is exceeded, determining whether to change the obtained settings in an identified configuration;
          responsive to a determination to not take the snapshot, determining whether a device change occurred;
          responsive to a determination the device change occurred, creating the snapshot of usage of the configured devices;
          responsive to a determination the device change did not occur, determining whether a calendar event occurred; and
          responsive to a determination the calendar event occurred, creating the snapshot of usage of the configured devices.

12. The apparatus of claim 11, wherein the authenticating the user of the predetermined system to form the authenticated user further comprises:
    performing a biometric confirmation of the user during a portion of the power-on process of the predetermined system.

13. The apparatus of claim 11, wherein the obtaining configurable configuration settings associated with the authenticated user for the predetermined system to form obtained settings further comprises:
    determining whether the user has a predefined configuration;

responsive to a determination that the user does have a predefined configuration, using the predefined configuration as the obtained settings;

responsive to a determination that the user does not have a predefined configuration, determining whether the user has a default configuration; and responsive to a determination that the user has a default configuration, using the default configuration as the obtained settings.

14. The apparatus of claim 11, wherein the using the obtained settings in the further portion of the power-on process to configure the predetermined system further comprises:

responsive to a determination to change the obtained settings in an identified configuration, applying a new configuration for use at a next power-on.

* * * * *